United States Patent
Noh et al.

(10) Patent No.: US 12,502,988 B2
(45) Date of Patent: Dec. 23, 2025

(54) ELECTRIC VEHICLE CHARGING DEVICE AND METHOD FOR CONTROLLING SAME

(71) Applicant: KOREA ATOMIC ENERGY RESEARCH INSTITUTE, Daejeon (KR)

(72) Inventors: Sunyoung Noh, Daejeon (KR); Kyungmin Jeong, Daejeon (KR); Sunguk Lee, Daejeon (KR); Myoungho Kim, Daejeon (KR); Doyeon Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 720 days.

(21) Appl. No.: 17/798,988

(22) PCT Filed: Aug. 28, 2020

(86) PCT No.: PCT/KR2020/011562
§ 371 (c)(1),
(2) Date: Aug. 11, 2022

(87) PCT Pub. No.: WO2021/162190
PCT Pub. Date: Sep. 19, 2021

(65) Prior Publication Data
US 2023/0067233 A1    Mar. 2, 2023

(30) Foreign Application Priority Data
Feb. 11, 2020    (KR) .................. 10-2020-0016555

(51) Int. Cl.
*B60L 53/10*    (2019.01)
*B60L 53/16*    (2019.01)
*B60L 53/30*    (2019.01)

(52) U.S. Cl.
CPC .............. *B60L 53/11* (2019.02); *B60L 53/16* (2019.02); *B60L 53/305* (2019.02)

(58) Field of Classification Search
CPC ......... B60L 53/11; B60L 53/305; B60L 53/16
(Continued)

(56) References Cited

U.S. PATENT DOCUMENTS 8,829,851 B2    9/2014    Prosser et al.
10,479,210 B2    11/2019    Beekmann
(Continued)

FOREIGN PATENT DOCUMENTS

JP    2015-231289 A    12/2015
KR    10-1009485 B1    1/2011
(Continued)

OTHER PUBLICATIONS

International Search Report dated Dec. 17, 2020 for corresponding International Patent Application No. PCT/KR2020/011562 with English translation.
(Continued)

*Primary Examiner* — Suchin Parihar
(74) *Attorney, Agent, or Firm* — Hauptman Ham, LLP

(57) ABSTRACT

The present invention relates to an electric vehicle charging device and to a method for controlling same. The electric vehicle charging device includes a plurality of charging cables installed in one electric vehicle charger. After battery charging of a vehicle, which has arrived first, is completed using one charging cable, a next vehicle is immediately charged using another charging cable such that even in a state where the vehicle, which has arrived first, does not leave a charging station, the next vehicle can be charged. Accordingly, it is possible to improve convenience of an electric vehicle user, and minimize waiting time for charg-
(Continued)

ing. Therefore, it is possible to improve the operational efficiency of the electric vehicle charger.

14 Claims, 4 Drawing Sheets

(58) Field of Classification Search
USPC .................................................. 320/109
See application file for complete search history.

(56) References Cited

U.S. PATENT DOCUMENTS

| | | | |
|---|---|---|---|
| 2013/0049677 A1* | 2/2013 | Bouman | B60L 1/02 320/106 |
| 2014/0247019 A1* | 9/2014 | Park | B60L 3/04 320/160 |
| 2014/0253034 A1* | 9/2014 | Kurimoto | B60L 50/16 320/109 |
| 2014/0347017 A1* | 11/2014 | Sugano | B60L 53/122 320/137 |
| 2016/0121735 A1* | 5/2016 | Sugano | H02J 7/342 320/109 |
| 2017/0106764 A1* | 4/2017 | Beaston | B60L 58/12 |
| 2020/0122597 A1* | 4/2020 | Ichikawa | B60L 53/16 |
| 2021/0101494 A1* | 4/2021 | Lee | B60L 53/60 |
| 2024/0140231 A1* | 5/2024 | Dicke | B60L 53/11 |
| 2024/0391345 A1* | 11/2024 | Lee | B60L 53/14 |
| 2025/0112475 A1* | 4/2025 | Malik | B60L 53/60 |
| 2025/0112476 A1* | 4/2025 | Malik | H01R 13/6397 |

FOREIGN PATENT DOCUMENTS

| | | |
|---|---|---|
| KR | 10-2012-0084616 A | 7/2012 |
| KR | 10-1488586 B1 | 2/2015 |
| KR | 10-2016-0008099 A | 1/2016 |
| KR | 10-2016-0118472 A | 10/2016 |
| KR | 10-2016-0122918 A | 10/2016 |
| KR | 10-2018-0116031 A | 10/2018 |
| KR | 10-2019-0122947 A | 10/2019 |

OTHER PUBLICATIONS

Written Opinion dated Dec. 17, 2020 for corresponding International Patent Application No. PCT/KR2020/011562.
Korean Office Action dated Apr. 16, 2021 for corresponding Korean Application No. 10-2020-0016555 with English Machine Translation.
Korean Final Office Action dated Oct. 25, 2021 for corresponding Korean Application No. 10-2020-0016555 with English Machine Translation.
Korean Notice of Allowance dated Dec. 21, 2021 for corresponding Korean application No. 10-2020-0016555 with English Machine Translation.
Prior Arts Search Report conducted by Korea Atomic Energy Research Institute (Applicant) dated Nov. 28, 2019 with partial English translation.

* cited by examiner

ELECTRIC VEHICLE CHARGING DEVICE AND METHOD FOR CONTROLLING SAME

CROSS-REFERENCE TO RELATED APPLICATION

This application is the National Stage filing under 35 U.S.C. 371 of International Application No. PCT/KR2020/011562, filed on Aug. 28, 2020, which claims the benefit of earlier filing date of and rights of priority to Korean Application 10-2020-0016555 filed on Feb. 11, 2020, the contents of which are all hereby incorporated by reference herein in their entirety.

TECHNICAL FIELD

The present disclosure relates to an electric vehicle charging device with an improved operating efficiency of an electric vehicle charger and a control method thereof.

BACKGROUND ART

An electric vehicle is an eco-friendly vehicle that is driven by using electric energy charged in a battery. As environmental regulations are strengthened and energy cost reduction is required, interest and research on electric vehicles are being actively carried out.

In order to expand the supply of electric vehicles, it is essential to build a charging infrastructure capable of charging a battery of an electric vehicle.

In particular, increasing a battery capacity of an electric vehicle has a disadvantage of increasing the weight of a vehicle body, so that a distance that can be driven by the electric vehicle is limited with one full charge.

The number of electric vehicle charging stations must be increased to charge an electric vehicle anytime, anywhere during medium-distance to long-distance driving of the electric vehicle.

On the other hand, an electric vehicle charger in the related art can only charge a single vehicle with a single charger, and thus a next vehicle must wait for charging until a vehicle that has come first is fully charged.

Furthermore, if a vehicle currently being charged does not return its charging cable subsequent to the completion of charging and does not move from a parking space of the charging station, a subsequent vehicle cannot be charged.

In general, a fast charger rectifies a large-capacity AC power and supplies the rectified DC power to a battery of an electric vehicle.

Here, the fast charger charges with high power, for example, about 50 kW to 150 kW, when a battery SOC (State Of Charge) is low due to the characteristics of an electric vehicle battery, but as the battery SOC increases, a charging current is gradually lowered to charge with relatively low power compared to initial charge.

However, such a charging method of the fast charger has a problem in that an operation rate of the charger is reduced since the battery is charged with lower power than a rated capacity of the charger.

Furthermore, an electric vehicle rapid charger is provided with a large-capacity AC-DC converter to charge the electric vehicle battery with power supplied from an AC power grid, and a DC power supply device for charging the vehicle battery is an important factor for determining a price of the electric vehicle rapid charger.

Therefore, a technology capable of charging multiple electric vehicles sequentially or simultaneously with a single electric vehicle charger is required.

In addition, a condition of installing an electric vehicle charger suggested by a power supply company (e.g., Korea Electric Power Corporation) requires a power facility that exceeds a rated capacity of the charger, and this has a problem in that the higher the capacity of the charger, the higher the unit price of power equipment drawn from the power supply company, thereby increasing the installation cost of the charger.

DISCLOSURE OF INVENTION

Technical Problem

The present disclosure is contrived to solve the foregoing problems, and a first aspect of the present disclosure is to provide an electric vehicle charger capable of automatically charging a subsequent vehicle immediately without moving a fully charged vehicle when a single electric vehicle is fully charged, thereby reducing charging standby time and allowing convenient charging, and a control method thereof.

A second aspect of the present disclosure is to provide an electric vehicle charger capable of charging a plurality of vehicles with a single charger, thereby increasing an operating efficiency of the charger and an operation rate of charging equipment, and a control method thereof.

A third aspect of the present disclosure is to provide an electric vehicle charger capable of charging a plurality of vehicles with a single charger such that there is no need to install a plurality of chargers to charge the plurality of vehicles, thereby reducing the installation cost of the charger, and a control method thereof.

Solution to Problem

In order to achieve the foregoing first and third aspects, an electric vehicle charging device according to the present disclosure may include an AC-DC converter that converts AC power supplied from a power supply unit into DC power; a plurality of DC switches connected in parallel to an output terminal of the AC-DC converter to supply or cut off the DC power; a plurality of AC switches connected in parallel to the power supply unit to supply or cut off the AC power; a plurality of connectors respectively connected to one DC switch of the plurality of DC switches and one AC switch of the plurality of AC switches; a plurality of charging cables extending from the DC switch or the AC switch to the connector, to be respectively connected between the switch and the connector; and a controller that controls the plurality of DC switches and the plurality of AC switches to selectively or simultaneously charge batteries of a plurality of electric vehicles connected to the plurality of connectors.

According to an example associated with the present disclosure, each of the plurality of connectors may be configured to support both rapid charging and slow charging.

According to an example associated with the present disclosure, the connector may be implemented as a combo 1 or combo 2 capable of using both DC and AC at the same time.

In order to achieve the foregoing second aspect, charging ports of a plurality of electric vehicles may be respectively connected to the plurality of connectors, and the controller may control the plurality of DC switches and the plurality of AC switches to constantly maintain charging power charged to the plurality of electric vehicles at a preset value.

According to an example associated with the present disclosure, the electric vehicle charging device may further include a display panel having a charging start button for charging the battery of the electric vehicle, wherein the controller charges the batteries of the plurality of electric vehicles in the order of pressing the charging start button based on charging request times, and charges a battery of a next electric vehicle in order when the charging of a battery of an electric vehicle being charged first from among the plurality of electric vehicles is completed.

According to an example associated with the present disclosure, the controller may start rapid charging from a first charging vehicle connected to any one of the plurality of connectors.

According to an example associated with the present disclosure, a battery SOC of the vehicle being rapidly charged may increase to reduce charging power that charges the battery, and the controller may supply a remaining AC current of the power supply unit to a second charging vehicle connected to another one of the plurality of connectors while using the charging power of the vehicle being rapidly charged to perform the AC slow charging of a battery of the second charging vehicle.

According to an example associated with the present disclosure, the battery SOC of the vehicle being rapidly charged may further increase to further reduce the charging power, and the controller may supply a remaining AC current of the power supply unit to a third charging vehicle connected to still another one of the plurality of connectors while using the AC current of the second charging vehicle to the maximum to perform the AC slow charging of a battery of the third charging vehicle.

According to an example associated with the present disclosure, when the DC charging power of the first charging vehicle is less than the AC slow charging maximum power of the first charging vehicle, the controller may switch the DC rapid charging of the first charging vehicle to AC slow charging to charge a battery of a next vehicle waiting for charging with DC rapid charging.

According to an example associated with the present disclosure, the controller may charge the batteries of the plurality of electric vehicles based on charging completion times, start charging from a vehicle with an earlier charging completion time, and determine charging priorities according to an order connected to the connector when the charging completion times of the plurality of electric vehicles overlap.

According to an example associated with the present disclosure, the electric vehicle charging device may further include a charger case that accommodates the AC-DC converter, the plurality of DC switches, the plurality of AC switches, and the controller therein, wherein the plurality of charging cables and the plurality of connectors are provided on an outer side of the charger case.

There is provided a method of controlling an electric vehicle charging device, in order to control the electric vehicle charging device having an AC-DC converter that converts AC power supplied from a power supply unit into DC power, the method may include controlling a plurality of DC switches connected in parallel to an output terminal of the AC-DC converter to supply or cut off the DC power; controlling a plurality of AC switches connected in parallel to the power supply unit to supply or cut off the AC power; connecting a plurality of connectors respectively connected to the plurality of DC switches and the plurality of AC switches through a plurality of charging cables to charging ports of a plurality of electric vehicles, respectively; and selectively or simultaneously charging batteries of a plurality of electric vehicles connected to the plurality of connectors.

According to an example associated with the control method of the present disclosure, each of the plurality of connectors may be implemented as combo 1 or combo 2 that supports both rapid charging and slow charging.

According to an example associated with the control method of the present disclosure, the charging of the batteries of the plurality of electric vehicles may control the plurality of DC and AC switches to constantly maintain charging power charged to the plurality of electric vehicles at a preset value.

According to an example associated with the control method of the present disclosure, the method may further include a display panel having a charging start button for charging the battery of the electric vehicle, wherein the charging of the batteries of the plurality of electric vehicles charges the batteries of the plurality of electric vehicles in the order of pressing the charging start button based on charging request times, and charges a battery of a next electric vehicle in order when the charging of the battery of the electric vehicle being charged first from among the plurality of electric vehicles is completed.

According to an example associated with the control method of the present disclosure, the charging of the batteries of the plurality of electric vehicles may start rapid charging from a first charging vehicle connected to any one of the plurality of connectors.

According to an example associated with the control method of the present disclosure, the charging of the batteries of the plurality of electric vehicles may include increasing a battery SOC of the first charging vehicle during the rapid charging of the first charging vehicle to reduce charging power that charges the battery; and supplying a remaining AC current of the power supply unit to a second charging vehicle while using the charging power of the vehicle being rapidly charged to perform the AC slow charging of a battery of the second charging vehicle.

According to an example associated with the control method of the present disclosure, the charging of the batteries of the plurality of electric vehicles may include further increasing the battery SOC of the first charging vehicle during the rapid charging of the first charging vehicle to further reduce charging power that charges the battery; and suppling a remaining AC current of the power supply unit to a third charging vehicle while using the AC current of the second charging vehicle to the maximum to perform the AC slow charging of the battery of the third charging vehicle.

According to an example associated with the control method of the present disclosure, the charging of the batteries of the plurality of electric vehicles may include switching the DC rapid charging of the first charging vehicle to AC slow charging to charge a battery of a next vehicle waiting for charging with DC rapid charging when the DC charging power of the first charging vehicle is less than the AC slow charging maximum power of the first charging vehicle.

According to an example associated with the control method of the present disclosure, the charging of the batteries of the plurality of electric vehicles may include charging the batteries of the plurality of electric vehicles based on charging completion times, and the charging based on the charging completion time may include starting charging from a vehicle with an earlier charging completion time, and determining charging priorities according to an order connected to the connector when the charging completion times of the plurality of electric vehicles overlap.

Advantageous Effects of Invention

The effects of the present disclosure configured as described above will be described as follows.

First, multiple charging cables may be provided in a single electric vehicle charger, and a vehicle that has come first may complete battery charging using a single charging cable, and then a next vehicle may immediately perform charging using another charging cable to allow charging of the next vehicle even in a state where the vehicle that has come first does not leave a charging space, thereby improving the convenience of an electric vehicle user, and minimizing charging standby time.

Second, each of a plurality of charging cables may be provided with a connector capable of DC rapid charging and AC slow charging, and the AC slow charging of a following vehicle may be enabled as a battery SOC of a preceding vehicle increases during the DC rapid charging of the preceding vehicle to have a margin for the charging power of the charger, and the DC rapid charging of the following vehicle may be enabled as DC charging is switched to AC charging when the battery SOC of the preceding vehicle further increases such that the charging power of the charger further decreases to be less than that using AC of the preceding vehicle, thereby improving the operating efficiency and operation rate of the charger.

Third, the charging of multiple vehicles may be enabled with a single charger, thereby greatly reducing the installation cost of the charger without installing a plurality of chargers to charge the multiple vehicles.

MODE FOR THE INVENTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, etc. can be used to describe various elements, but the elements should not be limited by those terms. The terms are used merely for the purpose to distinguish an element from the other element.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

The singular expression includes the plural expression unless context clearly dictates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Figure 1:
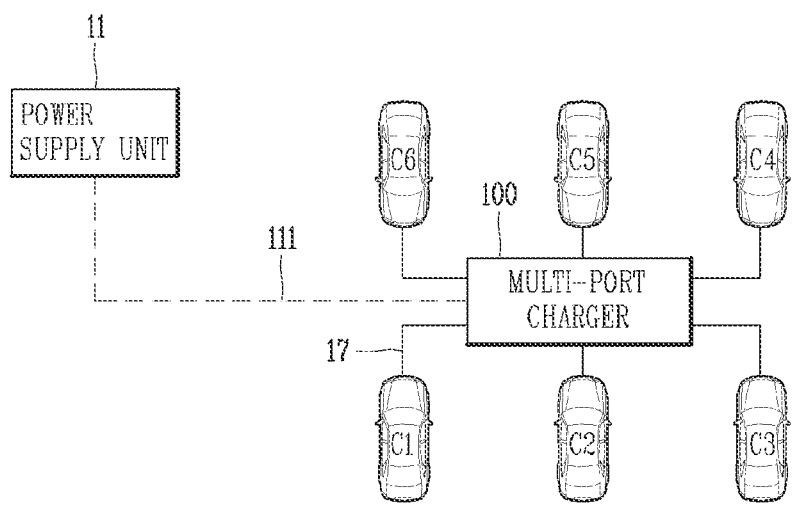
FIG. 1 is a conceptual diagram showing an electric vehicle charging device according to the present disclosure.
Figure 2:
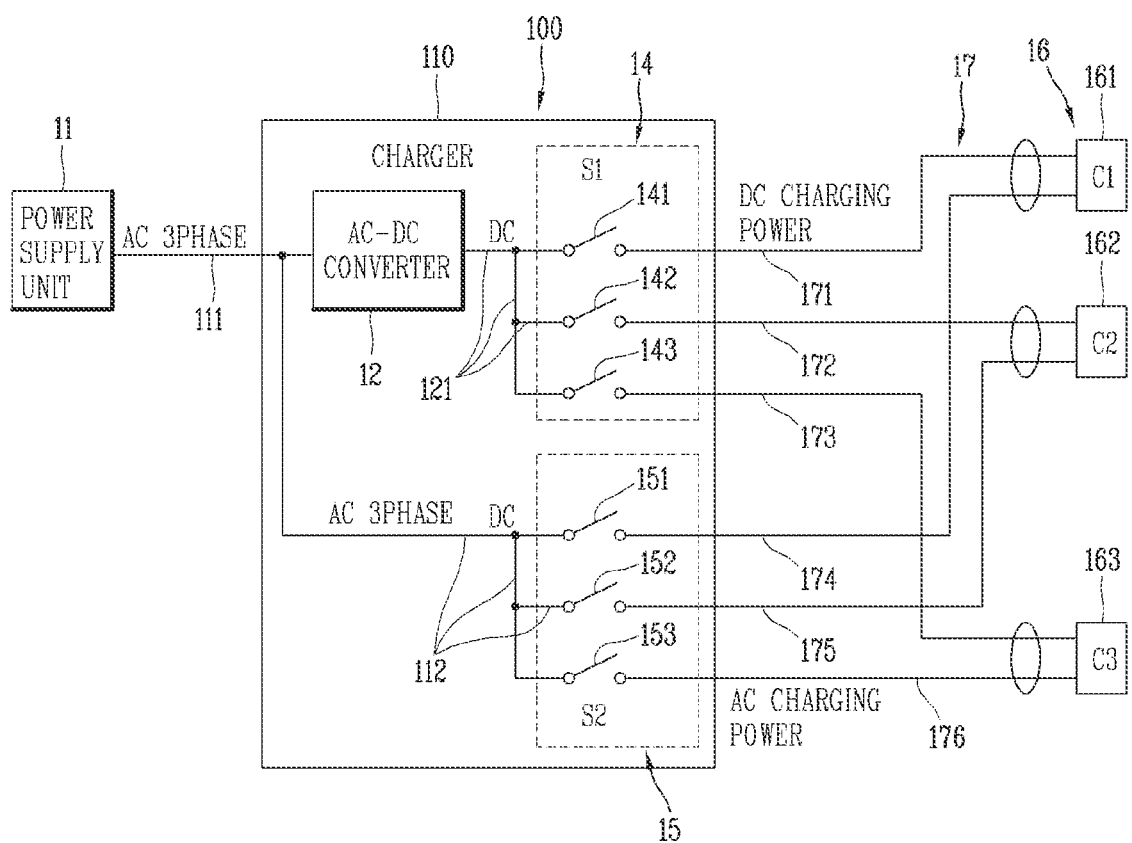
FIG. 2 is a conceptual diagram showing an internal configuration of the electric vehicle charging device in FIG. 1.
Figure 3:
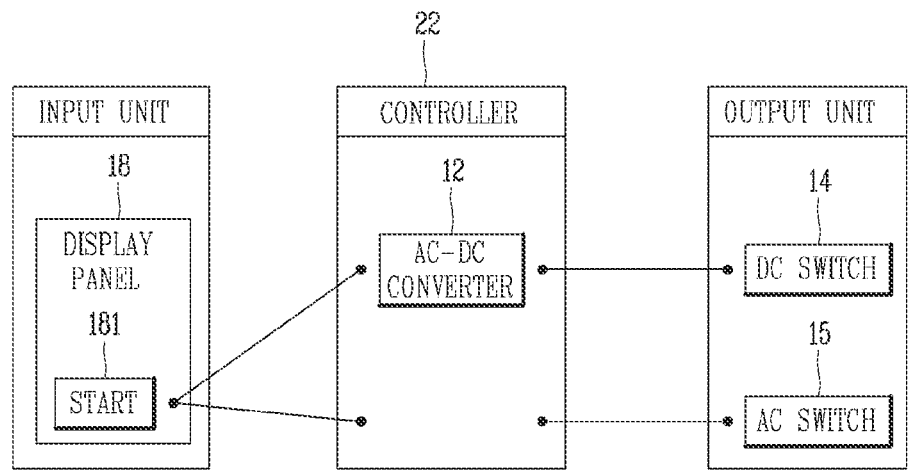
FIG. 3 is a block diagram showing a control flow of an electric vehicle charging device according to the present disclosure.
Figure 4:
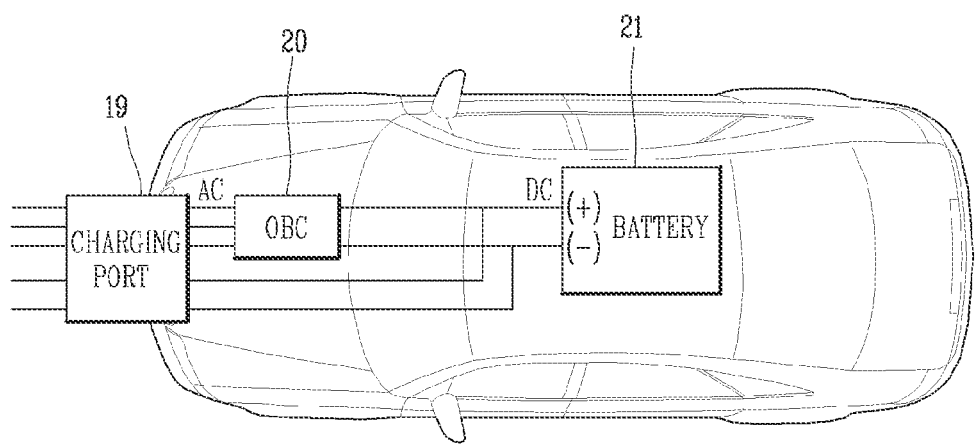
FIG. 4 is a conceptual diagram showing a state in which a charging port and a battery of an electric vehicle in FIG. 1 are electrically connected to each other.

FIG. 1 is a conceptual diagram showing an electric vehicle charging device 100 according to the present disclosure. FIG. 2 is a conceptual diagram illustrating an internal configuration of the electric vehicle charging device 100 in FIG. 1. FIG. 3 is a block diagram showing a control flow of the electric vehicle charging device 100 according to the present disclosure. FIG. 4 is a conceptual diagram showing a state in which a charging port 19 and a battery 21 of an electric vehicle in FIG. 1 are electrically connected to each other.

The electric vehicle charging device 100 of the present disclosure may include a plurality of charging cables 17 in a single charger.

The single charger may include a charger case 110, an AC-DC converter 12, a plurality of switches, a plurality of connectors 16, a plurality of charging cables 17, a controller 22, and a display panel 18.

The charger case 110 defines an exterior of the electric vehicle charger (or the electric vehicle charging device 100).

The AC-DC converter 12, the plurality of switches, and the controller 22 may be accommodated in the charger case 110.

The plurality of charging cables 17, the plurality of connectors 16, and the display panel 18 may be provided at an outside of the charger case 110.

The display panel may be provided at a position that is easy for a user to see with his or her naked eyes at an upper portion of the charger case 110.

A power supply unit 11 may include an input power line 111 to supply three-phase AC power.

The input power line 111 connects the power supply unit 11 and the AC-DC converter 12 to supply three-phase AC power to the AC-DC converter 12 through the input power line 111.

The AC-DC converter 12 is configured to convert AC power into DC power.

The plurality of switches are provided on a plurality of power lines to open and close the flow of currents, respectively. The plurality of switches may include a plurality of DC switches 14 and a plurality of AC switches 15.

The plurality of DC switches 14 are provided on the plurality of DC power lines 121, respectively, to supply or cut off DC power.

The plurality of DC switches 14 may be connected in parallel to an output terminal of the AC-DC converter 12.

The plurality of DC switches 14 includes a first DC switch 141 to an n-th DC switch.

Here, n is a natural number greater than or equal to 2. In the present embodiment, n may be 3. However, the present disclosure is not limited thereto.

The plurality of DC switches 14 may be configured with a first DC switch 141 to a third DC switch 143.

The plurality of DC power lines 121 may be provided separately from each other, or a plurality of power lines may be branched from a single power line. In the present embodiment, a state in which the single power line is connected in a branched manner to the plurality of power lines is shown.

The first to third DC switches 141, 142, 143 may be provided on the first DC power line 121 to the third DC power line 121, respectively, to open and close the flow of DC.

The plurality of AC switches 15 are provided on the plurality of AC power lines 112, respectively, to supply or cut off AC power.

One side of the input power line 111 may be connected to the power supply unit 11, and the other side of the input power line 111 may be connected to the AC-DC converter 12 or the plurality of AC switches 15.

The plurality of AC switches 15 may be connected in parallel to an output terminal of the AC-DC converter 12. The plurality of AC switches 15 may be connected in parallel to the input power line 111 (or the AC power line 112) of the power supply unit 11.

The plurality of AC switches 15 may be provided on separate AC power lines 112 different from one another or may be provided on the plurality of AC power lines 112, respectively, branched from a single power line.

In the present embodiment, the plurality of AC switches 15 are provided in the plurality of AC power lines 112 branched from the single power line.

The plurality of AC switches 15 includes a first AC switch 151 to an m-th AC switch.

Here, m is a natural number greater than or equal to 2. In the present embodiment, m may be 3. However, the present disclosure is not limited thereto.

The plurality of AC switches 15 may be configured with a first AC switch 151 to a third AC switch 153.

The first to third AC switches 151, 152, 153 are provided on the first AC power line 112 to the third AC power line 112, respectively, to open and close the flow of AC.

The plurality of charging cables 17 may be connected to a plurality of switches, respectively.

The plurality of charging cables 17 includes a first charging cable 171 to an L-th charging cable.

Here, L is a natural number greater than or equal to 2. In the present embodiment, L is 6. The plurality of charging cables 17 may configured with a first charging cable 171 to a sixth charging cable 176.

First to third charging cables 173 may be connected to the first to third DC switches 141, 142,143, respectively.

The first to third charging cables 171, 172, 173 may be DC charging cables.

Fourth to sixth charging cables 174, 175, 176 may be connected to the first to third AC switches 151, 152, 153, respectively.

The fourth to sixth charging cables 174, 175, 176 may be AC charging cables.

The connector 16 is provided at each end portion of the plurality of charging cables 17.

The plurality of connectors 16 are configured to be connectable to the charging ports 19 of electric vehicles for charging the batteries 21 of the electric vehicles.

The plurality of connectors 16 includes a first connector 161 to a k-th connector.

Here, k is a natural number greater than or equal to 2. In the present embodiment, k is 3. The plurality of connectors 16 may be configured with a first connector 161 to a third connector 163.

The plurality of connectors 16 may be configured to support both rapid charging and slow charging. The connector 16 may be implemented as a combo 1 and a combo 2 capable of using both DC and AC at the same time.

Each of the plurality of connectors 16 is connected to a DC charging cable and an AC charging cable to allow rapid charging and slow charging.

For example, the first connector 161 may be connected to the first DC switch 141 through the first charging cable 171, and the first connector 161 may be connected to the first AC switch 151 through the fourth charging cable 174.

When performing rapid charging using the first connector 161, the controller 22 may control a switch to turn on the first DC switch 141 and turn off the first AC switch 151.

When performing slow charging using the first connector 161, the controller 22 may control the switch to turn off the first DC switch 141 and turn on the first AC switch 151.

The second connector 162 may be connected to the second DC switch 142 through the second charging cable 172, and the second connector 162 may be connected to the second AC switch 152 through the fifth charging cable 175.

When performing rapid charging using the first connector 162, the controller 22 may turn on the second DC switch 142 and turn off the second AC switch 152.

When performing slow charging using the second connector 162, the controller 22 may turn off the second DC switch 142 and turn on the second AC switch 152.

The third connector 163 may be connected to the third DC switch 143 through the third charging cable 173, and the third connector 163 may be connected to the third AC switch 153 through the sixth charging cable 176.

When performing rapid charging using the third connector 163, the controller 22 may turn on the third DC switch 143 and turn off the third AC switch 153.

When performing slow charging using the third connector 163, the controller 22 may turn off the third DC switch 143 and turn on the third AC switch 153.

One end portion of the charging cable 17 is connected to the switch inside the charger, and the other end portion of the charging cable 17 is connected to the connector 16. The DC power or AC power of the charger may be selectively supplied or cut off by the switch.

The controller 22 is configured to control the switch. The controller 22 may open and close the switch according to the state of the battery 21 of the vehicle to selectively charge the battery 21 of the electric vehicle connected to the connector 16.

Furthermore, the controller 22 is configured to perform overall control for the operation of the charger, such as the control of the switch.

The display panel 18 is provided in an electric vehicle charger (charging device). The display panel 18 is configured to serve as an interface between the charger and the user.

The display panel 18 may include a charging start button 181 for charging the battery 21 of the electric vehicle. The user may press the charging start button 181 to start the charging of the battery 21.

The display panel 18 may be configured to display the SOC of the charging battery 21 of the charger for the user.

DC rapid charging may only charge one connector 16 at a time.

Since DC rapid charging uses the AC-DC converter 12 to properly generate and charge an optimal voltage for charging the battery 21 according to the state of the battery 21, the batteries 21 having different states (SOC levels, different temperatures) of the batteries 21 cannot be charged at the same time.

On the contrary, AC slow charging may charge multiple ports at a time.

Since AC slow charging uses an on-board-charger (OBC) 20 inside the vehicle to charge the battery 21 by generating a voltage suitable for the battery 21 for each vehicle in the OBC 20, respectively, the multiple batteries 21 can be charged at the same time.

Referring to FIG. 4, the connector 16 of the charging device may be connected to the charging port 19 of the electric vehicle.

With reference to FIG. 4, three electric lines located at an upper portion of the charging port 19 are electric lines for receiving three-phase AC power. During slow charging, three-phase AC power is supplied through three electric lines.

With reference to FIG. 4, two electric lines located at a lower portion of the charging port 19 are electric lines for receiving positive (+) and negative (−) DC power. During rapid charging, DC power is supplied through two electric lines.

Hereinafter, an embodiment, operation and effect of the electric vehicle charging device 100 according to the present disclosure will be described.

In the electric vehicle charging device 100 of the present disclosure, several charging cables 17 may be provided in a single electric vehicle charger, and when the battery 21 of a single vehicle is fully charged, the battery 21 of a next vehicle may be charged immediately.

That is, when the charging of the battery 21 is completed using a single charging cable from among a plurality of charging cables 17 provided in a single electric vehicle charger 100 for a single electric vehicle, even when the charging completed vehicle does not remove the connector 16 or move to another location, a next vehicle may charge the battery 21 using another one of the plurality of charging cables 17 provided in the charger.

A method of charging a plurality of electric vehicles with a single electric vehicle charger will be described.

For example, three electric vehicles may be charged sequentially or simultaneously using three charging cables 17 provided in the electric vehicle charger 100.

When three electric vehicles are connected to the first connector 161 to the third connector 163, respectively, for charging, the charging priority may be determined to sequentially perform charging according to the priority.

The charging priority may be determined based on a charging request time or a charging completion time of the vehicle user.

For convenience, it is assumed that charging is performed in the order of the first connector 161 to the third connector 163.

First, when charging is performed based on a charging request time, the battery 21 of a vehicle may be charged in the order that an electric vehicle user connects the connector 16 to the charging port 19 of the electric vehicle and presses a charging start button provided on the display panel 18 of the charger, and the battery 21 of a next vehicle may be charged in order when the charging is completed.

In the case of performing charging based on a charging completion time, charging may be started from a vehicle with an earlier charging completion time, but when the charging completion times of two or more vehicles overlaps, priority may be determined with reference to the order connected to the connector 16 of the charger.

When the battery SOC of the vehicle increases while a first vehicle V1 is rapidly charged with the first connector 161, the load is reduced than rated power when viewed from a primary side of the charger to have a margin for power capable of charging a power line.

At this time, an AC current is supplied to the second connector 162 to start the AC slow charging of a second vehicle as much as a reserve load.

Subsequently, when the charging vehicle connected to the first connector 161 is continuously charged to further increase the battery SOC, the rapid charging power is further reduced to have a margin for power capable of charging the power line even when the AC power of the second connector 162 is used to the maximum.

At this time, AC power may also be supplied to the third connector 163 to charge three vehicles at the same time.

That is, the first connector 161 is converted to a rapid charging mode to charge the battery 21 of the first vehicle with DC while the second connector 162 and the third connector 163 use AC power to the OBCs of the vehicles 20 to perform slow charging.

When the charging of the first vehicle connected to the first connector 161 continues such that DC charging power is decreased to be less than a capacity of the OBC 20 of the first vehicle, the DC rapid charging of the first connector 161 may be stopped, and switched to AC slow charging to allow the DC rapid charging to be used by another vehicle.

When the DC charging occupied by a vehicle connected to the first connector 161 is returned to another vehicle to use, a vehicle having a next priority may perform rapid charging with DC.

At this time, since the vehicle connected to the second connector 162 has the next priority, the vehicle connected to the second connector 162 that is performing AC slow charging may stop the AC slow charging to perform DC rapid charging.

When the DC charging power is large and there is no margin for supplying power to the power line, a vehicle connected to the third connector 163 may stop the AC slow charging, and the vehicle connected to the second connector 162 may be preferentially charged.

The vehicle connected to the third connector 163 stands by with no charging until the battery SOC of the vehicle connected to the second connector 162 increases to reduce the charging power.

Figure 5:
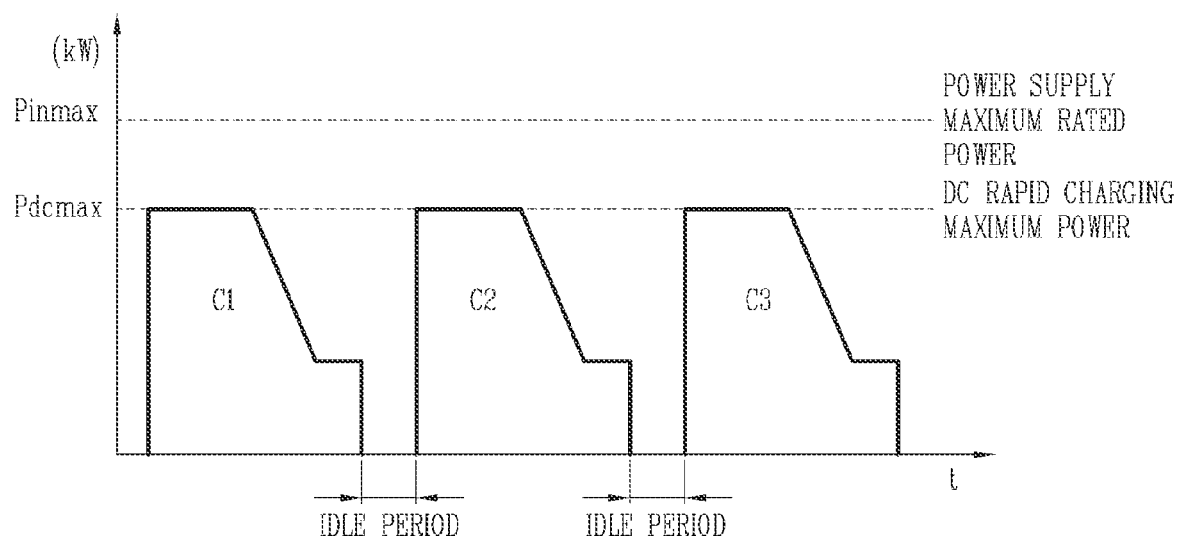
FIG. 5 is a conceptual diagram (graph) showing the power of a charger in the related art.
Figure 6:
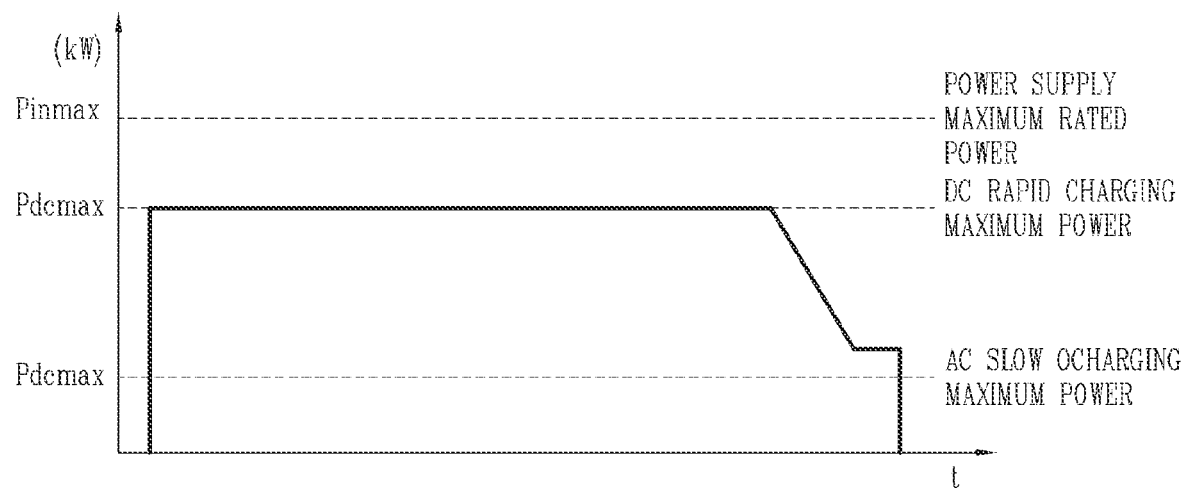
FIG. 6 is a conceptual diagram showing the power of a charger according to the present disclosure.

FIG. 5 is a conceptual diagram (graph) showing the power of a charger in the related art. FIG. 6 is a conceptual diagram showing the power of a charger according to the present disclosure.

Referring to FIG. 5, in a charger in the related art, only a single charging cable 17 is provided in a single charger, and as a result, the charging of the battery 21 of a vehicle that has come first is completed, and then the charging of a next vehicle may be performed after a predetermined standby time has elapsed. For a charger in a charging station in the related art, a standby time is required between the completion of the charging of a vehicle that has come first and the charging of a next vehicle. The standby time denotes a time it takes to remove the connector 16 from the charging port 19 of the vehicle that has come first and then move it to another place.

Referring to FIG. 6, the charger of the present disclosure may start the charging of the battery 21 for the next vehicle using another charging cable 17 with no standby time immediately after the charging of the vehicle that has come first is completed.

Furthermore, in a charger in the related art, when a predetermined time elapses after the charging of the vehicle connected to the first connector 161 has started, the charging power supplied to the charging port 19 of the charging vehicle decreases as the battery SOC of the vehicle increases, and as a result, the charging power of the charger in the related art repeats rising and falling (refer to FIG. 5).

However, in the charger of the present disclosure, after the charging of the vehicle connected to the first connector 161 is started, charging may be consecutively carried out for a vehicle connected to the second connector 162 or the third connector 163 through the other charging cable 17 as much as a reserve load caused by a decrease in the charging power supplied to the charging vehicle, and as a result, the charging power of the charger according to the present disclosure may continuously maintain a preset maximum value (refer to FIG. 6).

The controller 22 according to the present disclosure may control a plurality of switches to constantly maintain the charging power for charging the batteries 21 of the electric vehicles at a preset maximum value. The preset maximum value of the charging power may be a DC rapid charging maximum power.

Therefore, in the case of using an electric vehicle charger with the highest value of rated capacity supplied to the charger from a viewpoint of the equipment of the charger, an operation rate of the charger (charging equipment) becomes the maximum.

Figure 7:
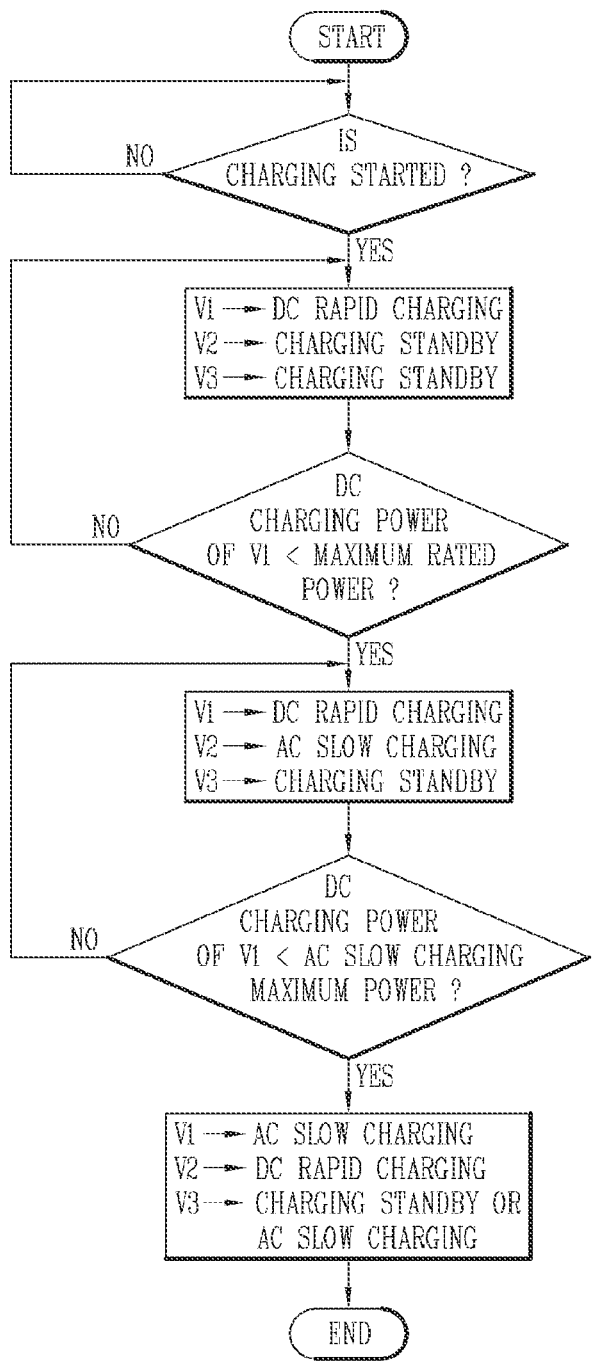
FIG. 7 is a flowchart for explaining a method of controlling an electric vehicle charging device according to the present disclosure.

FIG. 7 is a flowchart for explaining a method of controlling an electric vehicle charging device according to the present disclosure.

Hereinafter, a method of controlling the electric vehicle charging device 100 according to the present disclosure will be described.

First, the user connects the connector 16 to the charging port 19 of the electric vehicle, and then presses the charging start button 181 provided on the display panel 18 of the electric vehicle charger to check whether the charging of the electric vehicle battery 21 has been started. The controller 22 may receive a signal according to whether the charging start button 181 has been pressed to determine whether to charge.

A plurality of electric vehicles may be charged using a plurality of connectors 16 provided in a single charger.

When the charger uses the maximum power, the battery 21 is rapidly charged with the maximum rated power.

When the user presses the charging start button 181 and it is determined that charging has started, DC rapid charging is performed on the battery 21 of the first vehicle V1 connected to the first connector 161.

In the case of DC rapid charging, the charging of the battery 21 may be performed with DC rapid charging maximum power when the battery SOC of the vehicle is low, but the charging power gradually decreases when the battery SOC is high.

For example, when DC rapid charging is in progress due to high priority of the first vehicle V1, the first vehicle V1 initially charges the battery 21 with the DC rapid charging maximum power since the battery SOC is low. The charger has no margin for power capacity since the rapid charging of the first vehicle V1 is performed through the first connector 161, and thus charging is performed using only the first connector 161.

A second vehicle V2 connected to the second connector 162 and a third vehicle V3 connected to the third connector 163 stand by for charging.

Next, when the battery SOC increases during the charging of the first vehicle V1, the DC charging power of the first vehicle V1 is compared with the maximum rated power input to the charger.

Subsequently, when the battery SOC of the first vehicle connected to the first connector 161 gradually increases to reduce the charging power, the AC charging of the second vehicle connected to the second connector 162 is started.

When the DC charging power of the first vehicle V1 is less than the maximum rated power input to the charger, there may be a margin for power use to charge the second vehicle V2 using the AC charging cable 17 as much as an amount of reserve power. The third vehicle V3 stands by for charging.

Then, the DC charging power of the first vehicle is compared with the AC slow charging maximum power of the first vehicle.

When the charging power of the first vehicle V1 becomes less than the maximum AC slow charging power (OBC 20 capacity) of the vehicle being charged during DC rapid charging, charging using DC is performed no longer, and the DC rapid charging of the vehicle is released, and then switched to AC slow charging to supply AC power to the vehicle. The slow charging of the battery 21 is performed using the OBC 20 of the first vehicle V1.

The battery 21 of a next vehicle waiting for charging is charged with DC rapid charging.

Then, the controller 22 may stop the AC charging of the second vehicle connected to the second connector 162 waiting for charging to be switched to DC charging.

Therefore, according to the present disclosure, multiple charging cables 17 may be installed in a single electric vehicle charger, and the vehicle V1 that has come first completes the charging of the battery 21 using a single charging cable 17, and the next vehicle immediately performs charging using another charging cable 17 to allow the charging of the next vehicle even when the vehicle V1 that has come first does not leave a charging place, thereby improving the convenience of the electric vehicle user and minimizing charging standby time.

Furthermore, each of the plurality of charging cables 17 may be provided with the connector 16 capable of DC rapid charging and AC slow charging, and the AC slow charging of a following vehicle may be enabled as a battery SOC of a preceding vehicle V1 increases during the DC rapid charging of the preceding vehicle to have a margin for the charging power of the charger, and the DC rapid charging of the following vehicle may be enabled as DC charging is switched to AC charging when the battery SOC of the preceding vehicle V1 further increases such that the charging power of the charger further decreases to be less than that using AC of the preceding vehicle, thereby improving the operating efficiency and operation rate of the charger.

In addition, the charging of multiple vehicles may be enabled with a single charger, thereby greatly reducing the installation cost of the charger without installing a plurality of chargers to charge the multiple vehicles.

The invention claimed is:

1. An electric vehicle charging device comprising:
   an AC-DC converter configured to convert AC power supplied from a power supply unit into DC power;
   a plurality of DC switches connected in parallel to an output terminal of the AC-DC converter to supply or cut off the DC power;
   a plurality of AC switches connected in parallel to the power supply unit to supply or cut off the AC power;
   a plurality of connectors respectively connected to one DC switch of the plurality of DC switches and one AC switch of the plurality of AC switches;
   a plurality of charging cables extending from the DC switch or the AC switch to the connector, to be respectively connected between the switch and the connector; and
   a controller configured to control the plurality of DC switches and the plurality of AC switches to selectively or simultaneously charge batteries of a plurality of electric vehicles connected to the plurality of connectors,
   wherein the controller is configured to
      start DC rapid charging for a first charging vehicle connected to one connector of the plurality of connectors,
      supply a remaining AC current of the power supply unit to a second charging vehicle connected to an other connector of the plurality of connectors to perform AC slow charging of a battery of the second charging vehicle, wherein the remaining AC current is remained as a battery SOC of the first charging vehicle being rapidly charged increases, DC rapid charging power for the first charging vehicle is reduced, and a margin for charging power available on a power line is created, and
      switch the DC rapid charging for the first charging vehicle to AC slow charging to charge a battery of a next vehicle waiting for charging with DC rapid charging when the DC rapid charging power for the first charging vehicle is less than maximum AC slow charging power for the first charging vehicle.

2. The electric vehicle charging device of claim 1, wherein each of the plurality of connectors is configured to support both rapid charging and slow charging.

3. The electric vehicle charging device of claim 1, wherein the connector is implemented as a combo 1 or combo 2 capable of using both DC and AC at a same time.

4. The electric vehicle charging device of claim 2, wherein charging ports of the plurality of electric vehicles are respectively connected to the plurality of connectors, and wherein the controller is configured to control the plurality of DC switches and the plurality of AC switches to constantly maintain charging power charged to the plurality of electric vehicles at a preset value.

5. The electric vehicle charging device of claim 1, further comprising:
   a display panel having a charging start button for charging a battery of an electric vehicle,
   wherein the controller is configured to charge the batteries of the plurality of electric vehicles in an order of pressing the charging start button based on charging request times, and charge a battery of a next electric vehicle in order when the charging of a battery of an electric vehicle being charged first from among the plurality of electric vehicles is completed.

6. The electric vehicle charging device of claim 1, wherein the battery SOC of the first charging vehicle being rapidly charged further increases to further reduce the DC rapid charging power, and
   wherein the controller is configured to supply a further remaining AC current of the power supply unit to a third charging vehicle connected to an other connector of the plurality of connectors to perform AC slow charging of a battery of the third charging vehicle, wherein the further remaining AC current is remained after using the remaining AC current for the second charging vehicle to the maximum.

7. The electric vehicle charging device of claim 1, wherein the controller is configured to charge the batteries of the plurality of electric vehicles based on charging completion times, start charging from a vehicle with an earlier charging completion time, and determine charging priorities according to an order connected to the connector when the charging completion times of the plurality of electric vehicles overlap.

8. The electric vehicle charging device of claim 1, further comprising:
   a charger case that accommodates the AC-DC converter, the plurality of DC switches, the plurality of AC switches, and the controller therein,
   wherein the plurality of charging cables and the plurality of connectors are provided on an outer side of the charger case.

9. A method of controlling an electric vehicle charging device having an AC-DC converter configured to convert AC power supplied from a power supply unit into DC power, the method comprising:
   controlling a plurality of DC switches connected in parallel to an output terminal of the AC-DC converter to supply or cut off the DC power;
   controlling a plurality of AC switches connected in parallel to the power supply unit to supply or cut off the AC power;
   connecting a plurality of connectors respectively connected to the plurality of DC switches and the plurality of AC switches through a plurality of charging cables to charging ports of a plurality of electric vehicles, respectively;
   selectively or simultaneously charging batteries of a plurality of electric vehicles connected to the plurality of connectors;
   starting DC rapid charging for a first charging vehicle connected to one connector of the plurality of connectors;
   supplying a remaining AC current of the power supply unit to a second charging vehicle connected to an other connector of the plurality of connectors to perform AC slow charging of a battery of the second charging vehicle, wherein the remaining AC current is remained as a battery SOC of the first charging vehicle being rapidly charged increases, DC rapid charging power for the first charging vehicle is reduced, and a margin for charging power available on a power line is created; and switching the DC rapid charging for the first charging vehicle to AC slow charging to charge a battery of a next vehicle waiting for charging with DC rapid charging when the DC rapid charging power for the first charging vehicle is less than maximum AC slow charging power for the first charging vehicle.

10. The method of claim 9, wherein each of the plurality of connectors is implemented as combo 1 or combo 2 that supports both rapid charging and slow charging.

11. The method of claim 9, wherein the charging of batteries of a plurality of electric vehicles controls the plurality of DC switches and the plurality of AC switches to constantly maintain charging power charged to the plurality of electric vehicles at a preset value.

12. The method of claim 9, further comprising:
a display panel having a charging start button for charging a battery of an electric vehicle,
wherein the charging of batteries of a plurality of electric vehicles charges the batteries of the plurality of electric vehicles in an order of pressing the charging start button based on charging request times, and charges a battery of a next electric vehicle in order when the charging of the battery of the electric vehicle being charged first from among the plurality of electric vehicles is completed.

13. The method of claim 9, wherein the charging of the batteries of the plurality of electric vehicles comprises:
further increasing the battery SOC of the first charging vehicle during the DC rapid charging for the first charging vehicle to further reduce the DC rapid charging power for the first charging vehicle that charges a battery of the first charging vehicle; and
supplying a further remaining AC current of the power supply unit to a third charging vehicle connected to an other connector of the plurality of connectors to perform AC slow charging of a battery of the third charging vehicle, wherein the further remaining AC current is remained after using the remaining AC current for the second charging vehicle to the maximum.

14. The method of claim 9, wherein the charging of batteries of a plurality of electric vehicles comprises:
charging the batteries of the plurality of electric vehicles based on charging completion times, and
wherein the charging based on the charging completion time comprises:
starting charging from a vehicle with an earlier charging completion time, and
determining charging priorities according to an order connected to the connector when the charging completion times of the plurality of electric vehicles overlap.

* * * * *